US011843128B2

(12) United States Patent
Sawada et al.

(10) Patent No.: US 11,843,128 B2
(45) Date of Patent: Dec. 12, 2023

(54) CELL MODULE

(71) Applicant: Panasonic Intellectual Property Management Co., Ltd., Osaka (JP)

(72) Inventors: Koichi Sawada, Osaka (JP); Takeshi Nagao, Osaka (JP); Jiro Muratsu, Osaka (JP); Keisuke Naito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 531 days.

(21) Appl. No.: 17/253,599

(22) PCT Filed: Feb. 8, 2019

(86) PCT No.: PCT/JP2019/004691
§ 371 (c)(1),
(2) Date: Dec. 17, 2020

(87) PCT Pub. No.: WO2019/244392
PCT Pub. Date: Dec. 26, 2019

(65) Prior Publication Data
US 2021/0257704 A1    Aug. 19, 2021

(30) Foreign Application Priority Data
Jun. 22, 2018 (JP) ................................. 2018-118402

(51) Int. Cl.
*H01M 50/503* (2021.01)
*H01M 50/213* (2021.01)
(Continued)

(52) U.S. Cl.
CPC ....... *H01M 50/503* (2021.01); *H01M 50/213* (2021.01); *H01M 50/50* (2021.01);
(Continued)

(58) Field of Classification Search
CPC ............. H01M 50/107; H01M 50/152; H01M 50/148; H01M 50/213; H01M 50/20;
(Continued)

(56) References Cited

U.S. PATENT DOCUMENTS

| | | | | |
|---|---|---|---|---|
| 2010/0159289 A1* | 6/2010 | Kim | ..................... | H01M 10/42 429/7 |
| 2011/0206970 A1* | 8/2011 | Itoi | ..................... | H01M 50/213 429/120 |
| 2014/0255748 A1 | 9/2014 | Jan et al. | | |

FOREIGN PATENT DOCUMENTS

JP    2016-516273    6/2016

OTHER PUBLICATIONS

International Search Report of PCT application No. PCT/JP2019/004691 dated Apr. 23, 2019.

\* cited by examiner

*Primary Examiner* — Matthew W Van Oudenaren
(74) *Attorney, Agent, or Firm* — Rimon P.C.; Michael E. Fogarty

(57) ABSTRACT

A cell module includes a plurality of cells that each have a cylindrical shape and include a positive-electrode terminal and a negative-electrode terminal disposed on one end of the cell. One of the terminals is located at a center, and the other terminal is located on a circumferential edge and is electrically connected to a side surface of a tube of each of the cells, a connection intervening member mounted on the other terminal includes a tab extending along the side surface of the tube and electrically connected to the side surface, and a hole that causes the center of the one end to be exposed. The plurality of cells make up a cell block where the one ends are oriented in an identical direction, and cells adjacent to each other are aligned in rows, on the one ends of the plurality of cells, a plate having electrical insulating
(Continued)

properties is disposed, the plate is provided with a hole that causes the one end of each of the cells to be exposed and is further provided with a plurality of conductive members on a surface of the plate distant from the cells, the conductive members extend along the rows of the cells aligned, two of the conductive members are disposed for each cell block and include terminal connectors electrically connected to terminals, having identical polarity, of the cells in each cell block, and the other terminals are connected with the terminal connectors through the connection intervening member.

7 Claims, 8 Drawing Sheets

(51) Int. Cl.
| | | |
|---|---|---|
| *H01M 50/50* | (2021.01) | |
| *H01M 50/583* | (2021.01) | |
| *H01M 50/593* | (2021.01) | |
| *H01M 50/107* | (2021.01) | |
| *H01M 50/545* | (2021.01) | |
| *H01M 50/559* | (2021.01) | |
| *H01M 50/526* | (2021.01) | |
| *H01M 50/20* | (2021.01) | |
| *H01M 50/55* | (2021.01) | |
| *H01M 50/152* | (2021.01) | |

(52) U.S. Cl.
CPC ........ *H01M 50/583* (2021.01); *H01M 50/107* (2021.01); *H01M 50/152* (2021.01); *H01M 50/20* (2021.01); *H01M 50/526* (2021.01); *H01M 50/545* (2021.01); *H01M 50/55* (2021.01); *H01M 50/559* (2021.01); *H01M 50/593* (2021.01)

(58) Field of Classification Search
CPC ............. H01M 50/507; H01M 50/502; H01M 50/516; H01M 50/503; H01M 50/509; H01M 50/519; H01M 50/526; H01M 50/284; H01M 50/287; H01M 50/545; H01M 50/55; H01M 50/559; H01M 50/588; H01M 50/593; H01M 50/147; H01M 50/155; H01M 50/572; H01M 50/50; H01M 50/569
See application file for complete search history.

CELL MODULE

CROSS-REFERENCE TO RELATED APPLICATIONS

This application is a U.S. national stage application of the PCT International Application No. PCT/JP2019/004691 filed on Feb. 8, 2019, which claims the benefit of foreign priority of Japanese patent application No. 2018-118402, filed on Jun. 22, 2018, the contents all of which are incorporated herein by reference.

TECHNICAL FIELD

The present invention relates to a cell module including a plurality of cells.

BACKGROUND ART

In recent years, from the viewpoint of resource saving and energy saving, the demand for reusable secondary batteries such as nickel-metal hydride secondaries battery, nickel-cadmium secondary batteries, and lithium-ion secondary batteries is on the increase. Among them, the lithium-ion secondary batteries have characteristics of being lightweight, high in electromotive force, and high in energy density. Therefore, the demand for such lithium-ion secondary batteries as driving power sources of various types of portable electronic devices and mobile communication devices such as cellular phones, digital cameras, video cameras, and laptop computers is on the increase.

On the other hand, in order to reduce the amount of fossil fuel used and $CO_2$ emissions, the anticipation about the application of cell modules to power sources for driving motors such as automobiles and power sources for home and industrial use is mounting. Examples of such a cell module include a configuration where a plurality of assembled batteries each made up of a plurality of cells connected in parallel and in series are mounted in order to obtain a desired voltage and capacity. PTL 1 discloses such a cell module (battery pack) that includes a plurality of battery cells having the first terminals of the battery cells provided on the first ends of the plurality of battery cells and having a plurality of portions of the second terminals of the battery cells provided on the first ends of the plurality of battery cells, the first ends of the plurality of battery cells being arranged flush with each other, and a plurality of bus bars that are coupled to the first terminals and the portions of the second terminals of the plurality of battery cells such that the bus bars are provided near the first ends of the plurality of battery cells, and the plurality of battery cells are connected in series, in parallel, or in both series and parallel.

CITATION LIST

Patent Literature

PTL 1: Unexamined Japanese Patent Publication (Translation of PCT Application) No. 2016-516273

SUMMARY OF THE INVENTION

However, in the cell module disclosed in PTL 1, since the terminal of the battery cell and the bus bar are connected by wire bonding, the time required for making the connections in the connection process becomes longer, the cost increases accordingly, and a problem arises that although the bonding portion serves as a fuse because the current density becomes the highest in the bonding portion, it is difficult to make all the lengths and thicknesses of the bonding wires identical to each other in the cell module, leading to a decrease in stability of the fuse characteristics.

The present invention has been made in view of the above-described points, and it is therefore an object of the present invention to provide a cell module capable of reliably connecting cells at low cost.

A cell module according to the present invention includes a plurality of cells. Each of the cells has a cylindrical shape and includes a positive-electrode terminal and a negative-electrode terminal disposed on one end of the cell, one of the positive-electrode terminal and the negative-electrode terminal is located at a center of the one end, and the other terminal is located on a circumferential edge of the one end and is electrically connected to a side surface of a tube of each of the cells, on the circumferential edge of the one end of each of the cells, a connection intervening member is mounted, the connection intervening member includes a tab extending along the side surface of the tube of each of the cells and electrically connected to the side surface, and a hole from which the center of the one end is exposed, the plurality of cells make up a cell block in which the plurality of cells are arranged such that the one ends are oriented in an identical direction, and the cells adjacent to each other are aligned in rows, on the one ends of the plurality of cells arranged, a plate having electrical insulating properties is disposed, the plate is provided with a hole from which the one end of each of the plurality of cells is exposed and is further provided with a plurality of conductive members on a surface of the plate distant from the cells, the conductive members extend along the rows of the cells aligned in the cell block, and two of the conductive members are disposed for each cell block and include terminal connectors that pass through the holes to be electrically connected to terminals, having identical polarity, of the cells included in each cell block, and an electrical connection between the other terminal and each of the terminal connectors is established through a connection between each of the terminal connectors and the connection intervening member.

The tab may be disposed separate from an adjacent cell of the cells.

The cells may have a cylindrical shape, and the tab may be disposed in a space formed by adjacent cells of the cells.

A protective member having electrical insulating properties may be disposed between the connection intervening member and the one end of each of the cells.

The connection intervening member may further include a tongue-shaped piece extending along the side surface of the tube of each of the cells.

The connection intervening member may include an outward protrusion that protrudes outward relative to other portions, and the outward protrusion may be connected to each of the terminal connectors.

The outward protrusion may be disposed separate from an adjacent cell of the cells.

According to the present invention, since the connection intervening member is mounted on the circumferential edge of the one end of each of the cells and is electrically connected to the side surface of the tube of the cell, and the terminal connector of the conductive member is connected to the connection intervening member, the terminal connector and the connection intervening member can be reliably and electrically connected.

DESCRIPTION OF EMBODIMENTS

Figure 1:
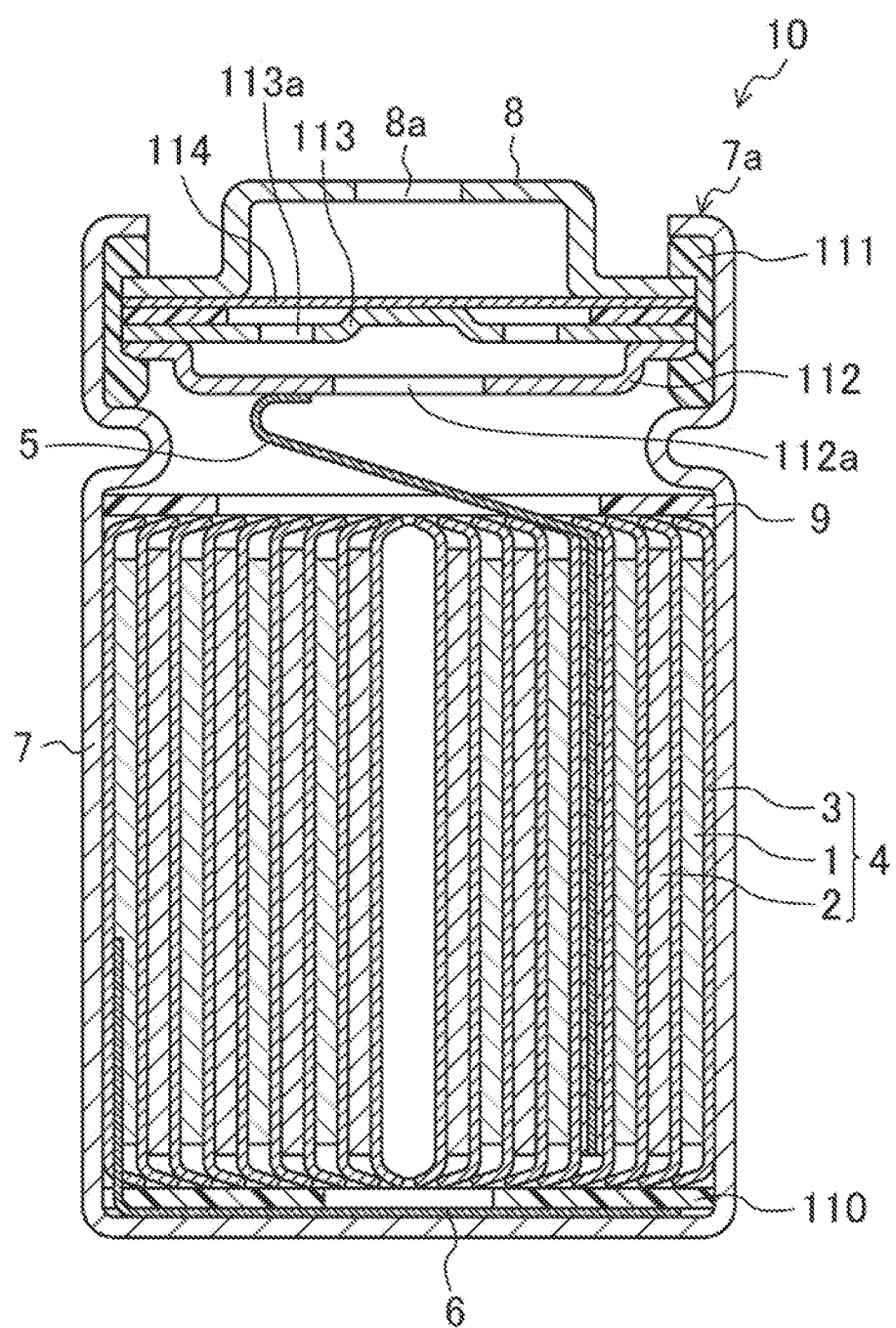
FIG. 1 is a schematic cross-sectional view of a cell.

Hereinafter, exemplary embodiments of the present invention will be described in detail with reference to the drawings. The following description of preferred exemplary embodiments is merely illustrative of the present invention and is not intended to restrict the present invention, applications of the present invention, or uses of the present invention. In the following drawings, for the sake of brevity, configuration elements having substantially the same function are denoted by the same reference numerals.

FIRST EXEMPLARY EMBODIMENT

<Cell>

FIG. 1 is a cross-sectional view schematically showing a configuration of cell 10 used in a cell module according to a first exemplary embodiment of the present invention. Note that a battery used in the cell module according to the present invention may be used singly as a power source for a portable electronic device such as a laptop computer (hereinafter, the battery used in the cell module is referred to as a "cell"). This configuration allows a high-performance general-purpose battery to be used as a cell of the cell module and thus makes it possible to enhance the performance of the cell module and reduce the cost of the cell module in a more simplified manner.

As cell 10 used in the cell module according to the present invention, for example, a cylindrical lithium-ion secondary battery as shown in FIG. 1 may be used. This lithium-ion secondary battery has a normal configuration, and is provided with a safety mechanism that releases gas to the outside of the battery when the pressure inside the battery rises due to the occurrence of an internal short circuit or the like. Hereinafter, a specific configuration of cell 10 will be described with reference to FIG. 1.

As shown in FIG. 1, a group of electrodes 4 each made up of positive electrode 2, negative electrode 1, and separator 3, positive electrode 2 and negative electrode 1 being wound with separator 3 interposed between positive electrode 2 and negative electrode 1, is housed in cell case 7 together with a non-aqueous electrolyte solution. Insulating plates 9, 110 are disposed above and below the group of electrodes 4, positive electrode 2 is bonded to filter 112 via positive-electrode lead 5, and negative electrode 1 is bonded, via negative-electrode lead 6, to a bottom of cell case 7 that also serves as a negative-electrode terminal.

Filter 112 is connected to inner cap 113, and a protrusion of inner cap 113 is bonded to valve plate 114 made of metal. Further, valve plate 114 is connected to a terminal plate that also serves as positive-electrode terminal 8. Then, the terminal plate, valve plate 114, inner cap 113, and filter 112 are integrated to seal an opening of cell case 7 together with gasket 111. Note that cell case 7 extends up to an upper end of gasket 111 and presses gasket 111 to firmly seal the opening of cell case 7. An upper end (negative-electrode terminal 7a) of cell case 7 placed on the upper end of gasket 111 is located adjacent to the terminal plate (positive-electrode terminal 8); therefore, both positive-electrode terminal 8 and negative-electrode terminal 7a are located on one end (upper side in FIG. 1) of the cylinder. Note that since negative-electrode terminal 7a is a part of cell case 7, a side surface of cell case 7 having a tubular shape is also electrically connected to negative-electrode terminal 7a.

When an internal short circuit or the like occurs in cell 10, and pressure inside cell 10 rises accordingly, valve body 114 swells toward the terminal plate. When inner cap 113 and valve body 114 are separated from each other, a current path is interrupted. When the pressure inside cell 10 further rises, valve body 114 ruptures. This causes gas generated in cell 10 to be discharged to the outside through through-hole 112a of filter 112, through-hole 113a of inner cap 113, a gap in valve body 114, and opening 8a of the terminal plate.

Note that the safety mechanism that discharges the gas generated in cell 10 to the outside is not limited to the structure shown in FIG. 1, and may have another structure.

<Connection Intervening Member>

Figure 2:
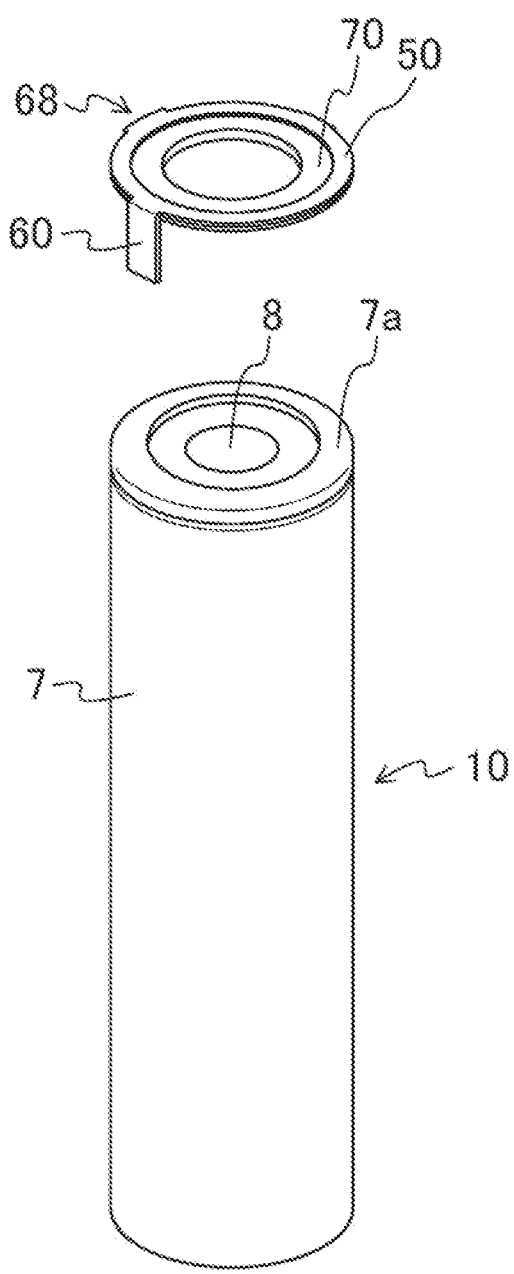
FIG. 2 is a schematic perspective view of the cell and a connection intervening member according to an exemplary embodiment.
Figure 3:
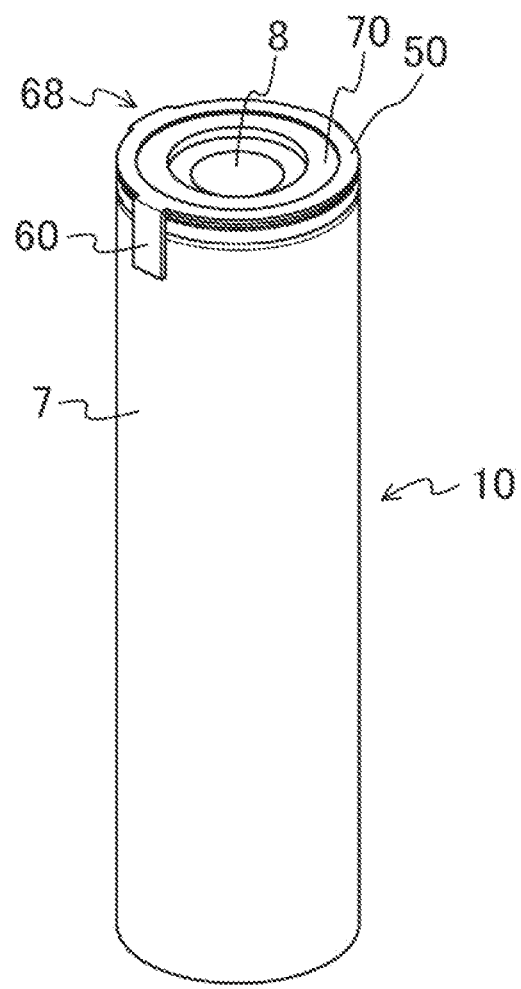
FIG. 3 is a schematic perspective view of the cell with the connection intervening member according to the exemplary embodiment mounted on the cell.

As shown in FIGS. 2, 3, connection intervening member 50 is mounted on one end of cell 10 where positive-electrode terminal 8 and negative-electrode terminal 7a are disposed. Connection intervening member 50 is made of a conductor, and metal is preferable as the conductor, and a Ni-plated steel plate is used according to the present exemplary embodiment.

Connection intervening member 50 is a ring-shaped plate having a hole at a center, and includes tab 60 extending downward from an outer circumferential edge of connection intervening member 50 along the side surface of cell case 7 of cell 10. Further, connection intervening member 50 includes outward protrusion 68 at the outer circumferential edge that is different in position from tab 60 and protrudes outward relative to the other portions. Further, protective member 70 having electrical insulating properties is disposed between connection intervening member 50 and cell 10; therefore, connection intervening member 50 is mounted on a circumferential edge of one end of cell 10 (corresponding to negative-electrode terminal 7a) with protective member 70 interposed between connection intervening member 50 and cell 10.

Tab 60 is electrically connected to the side surface of cell case 7 of cell 10 by welding or the like, thereby causing connection intervening member 50 to be electrically connected to negative-electrode terminal 7a. Further, outward protrusion 68 is a portion that protrudes slightly outward from an outer circumferential circle of connection intervening member 50.

Such a configuration can establish a reliable electrical connection between connection intervening member 50 and negative-electrode terminal 7a, and provide outward protrusion 68 having a large area and a flat surface. Note that protective member 70 is provided so as to provide electrical isolation between connection intervening member 50 and positive-electrode terminal 8 and to prevent positive-electrode terminal connector 41 of a conducting member from coming into contact with connection intervening member 50.

Figure 7:
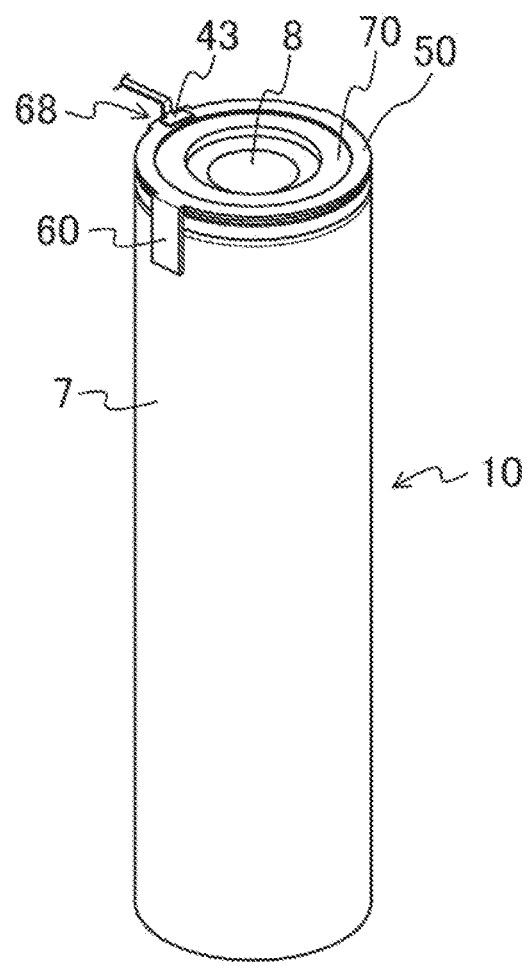
FIG. 7 is a schematic perspective view of the cell with the connection intervening member according to the exemplary embodiment mounted on the cell and the cell connected to a negative-electrode terminal connector.

As shown in FIG. 7, negative-electrode terminal connector 43 of a conductive member is connected to outward protrusion 68 of connection intervening member 50. Outward protrusion 68 according to the present exemplary embodiment is flat in surface. On the other hand, negative-electrode terminal 7a corresponding to the outer circumference of one end (upper surface) of cell 10 is not flat in surface. Since FIG. 1 is a schematic diagram, the surface of negative-electrode terminal 7a looks flat, but in reality, the outer circumferential edge is rounded because the upper end of cell case 7 is crimped, and the surface slopes downward into a center axis of cell 10. Therefore, when negative-electrode terminal connector 43 is directly bonded (connected by welding) to negative-electrode terminal 7a of cell 10 without using connection intervening member 50, negative-electrode terminal connector 43 and negative-electrode terminal 7a are brought into line contact or point contact, which may make a bonding area insufficient and in turn increase electrical resistance or prevent an electrical connection from being established.

However, the use of connection intervening member 50 according to the present exemplary embodiment allows outward protrusion 68 to be flat in surface and large in area; therefore, when outward protrusion 68 is bonded to negative-electrode terminal connector 43, their respective planes are bonded to each other, which makes it possible to provide a sufficient bonding area and a strong connection with low resistance. Further, protective member 70 serves as a cushion at the time of bonding and allows more reliable bonding.

<Cell Module>

Figure 4:
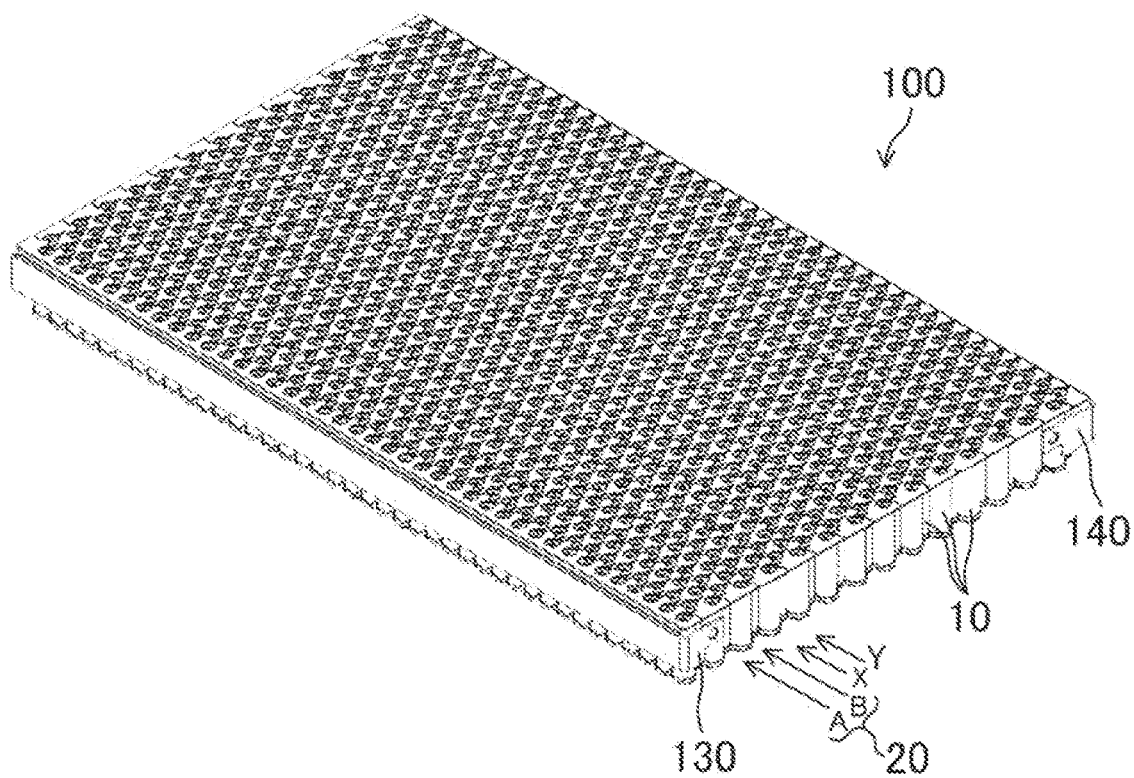
FIG. 4 is a schematic perspective view of a cell module according to the exemplary embodiment.
Figure 5:
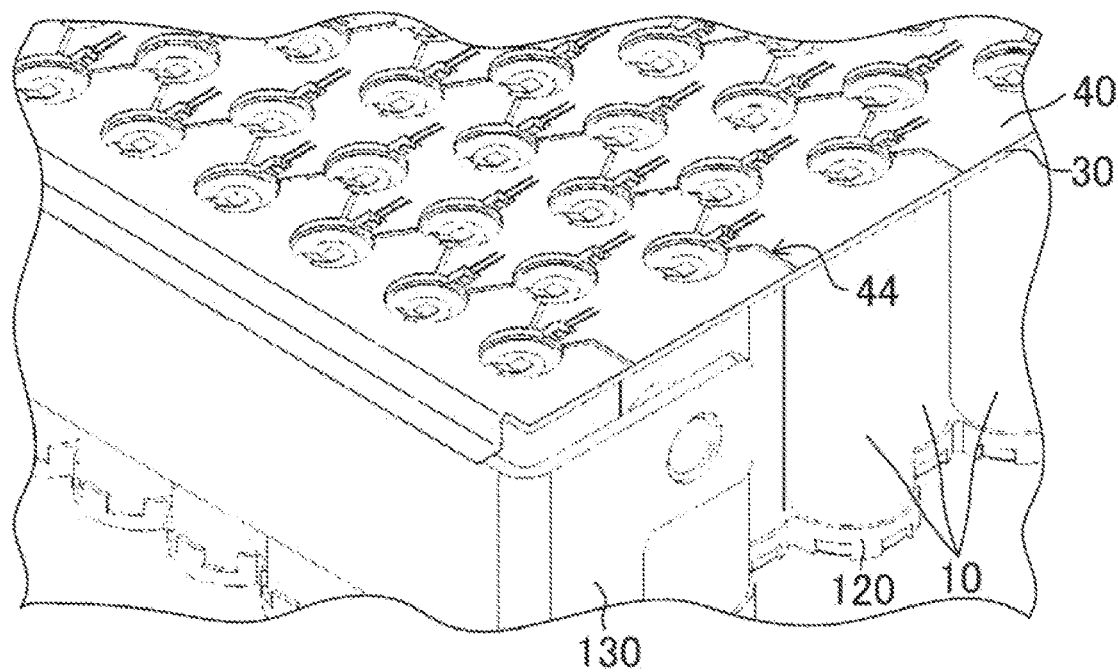
FIG. 5 is a partially enlarged view of the cell module according to the exemplary embodiment.
Figure 6:
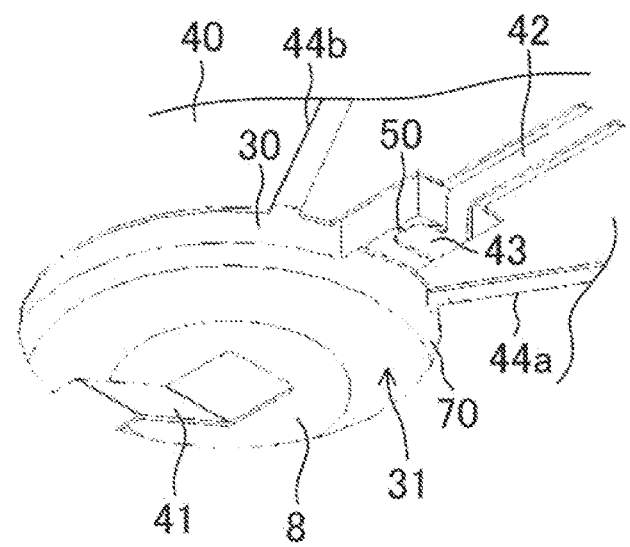
FIG. 6 is an enlarged view of one end of each cell of the cell module according to the exemplary embodiment.

FIG. 4 is a schematic perspective view of cell module 100 according to the present exemplary embodiment. Note that FIG. 4 shows an internal structure with a cover and the like removed for the sake of explanation. FIG. 5 is a partially enlarged view of FIG. 4, and FIG. 6 is an enlarged view of one end of one cell 10 in cell module 100 where positive-electrode terminal 8 and negative-electrode terminal 7a are disposed, and connection intervening member 50 is mounted.

In cell module 100, a plurality of cells 10 are arranged such that the one ends where positive-electrode terminal 8 and negative-electrode terminal 7a are disposed facing upward as shown in FIG. 4. The other ends of cells 10 are fitted in and fixed to cell holder 120. Since the plurality of cells 10 are densely packed in cell module 100 with consideration given to safety, adjacent cells are arranged in close proximity to each other to form rows A, B, X, Y. Two rows A, B make up cell block 20. Two rows X, Y adjacent to rows A, B make up a separate cell block. These rows extend straight, with the plurality of rows arranged side by side in parallel. On both side ends of cell module 100, a positive-electrode side current collecting member and a negative-electrode side current collecting member extending in parallel with the rows are arranged, positive-electrode side external terminal connector 130 is disposed on both ends of the positive-electrode side current collecting member, and negative-electrode side external terminal connector 140 is disposed on both ends of the negative-electrode side current collecting member.

Insulating plate (plate having electrical insulating properties) 30 is disposed on the one ends of cells 10. Insulating plate 30 is provided with hole 31 corresponding to each of cells 10. Hole 31 has a circle slightly smaller in diameter than a center hole of connection intervening member 50 and a partial cutout extending outward from the circle and having a rectangular shape, and causes positive-electrode terminal 8 and a part of connection intervening member 50 of a corresponding one of cell 10 to be exposed. Conductive member 40 made of a plate-shaped metal material is provided on a surface of insulating plate 30, the surface being opposite to a surface of the plate which faces cells 10. A plurality of conductive members 40 are provided on insulating plate 30. The plurality of conductive members 40 are separated by slits 44, 44a, 44b and are therefore electrically separated from each other.

Examples of the material of insulating plate 30 include a thin plate that results from hardening glass fiber with epoxy resin and a resin plate such as acrylic (polymethyl methacrylate (PMMA)) or polycarbonate (PC). Examples of the material of conductive member 40 include aluminum and copper.

Almost all the part of conductive member 40 facing hole 31 is removed to form a hole in a similar manner. However, positive-electrode terminal connector 41 connected to positive-electrode terminal 8 and negative-electrode terminal connector 43 connected to connection intervening member 50 protrude into the hole of conductive member 40. Furthermore, conductive member 40 slightly overhangs hole 31 of insulating plate 30 at the edge of hole 31. Such an overhang allows an increase in area of conductive member 40 and thereby allows an increase in amount of current flowing through one conductive member 40. This further allows an increase in surface area of conductive member 40 and thereby allows an increase in amount of heat dissipation.

Further, of negative-electrode terminal connector 43, connecting portion 42 connected to a main body of conductive member 40 has a narrow strip shape and is designed to allow the current flowing through connecting portion 42 to be the highest in density per unit cross-sectional area in conductive member 40. That is, the cross-sectional area of the flow path of the current flowing through connecting portion 42 is set to be equal to or less than a predetermined area, and when an overcurrent flows, connecting portion 42 is burnt out; therefore, connecting portion 42 serves as a fuse.

Conductive member 40 may be formed by cutting with a laser, etching, or the like. Such working makes it possible to reduce variations in their respective shapes, dimensions, and cross-sectional areas of positive-electrode terminal connector 41 and negative-electrode terminal connector 43. This allows the amount of current that burns out connecting portion 42 of negative-electrode terminal connector 43 to be uniform among the connecting portions 42 with no variation.

Since the plurality of cells 10 are arranged as densely as possible, the center axes of cells 10 adjacent to each other form an equilateral triangle when cell module 100 is viewed from above. Therefore, cells 10 adjacent to each other form a triangular (each side is formed by an arc) gap (space). Connection intervening member 50 is mounted on each of cells 10 such that tab 60 and outward protrusion 68 are located in the triangular gap (space). In other words, in cell module 100, cells 10 are arranged such that their respective tabs 60 and outward protrusions 68 are located in the triangular gaps (spaces). Tab 60 and outward protrusion 68 of connection intervening member 50 are arranged separate from another cell adjacent to cell 10 on which connection intervening member 50 is mounted. Therefore, since tabs 60 and outward protrusions 68 of connection intervening members 50 of cells 10 adjacent to each other do not come into contact with each other, problems such as a short circuit can be prevented.

Figure 8:
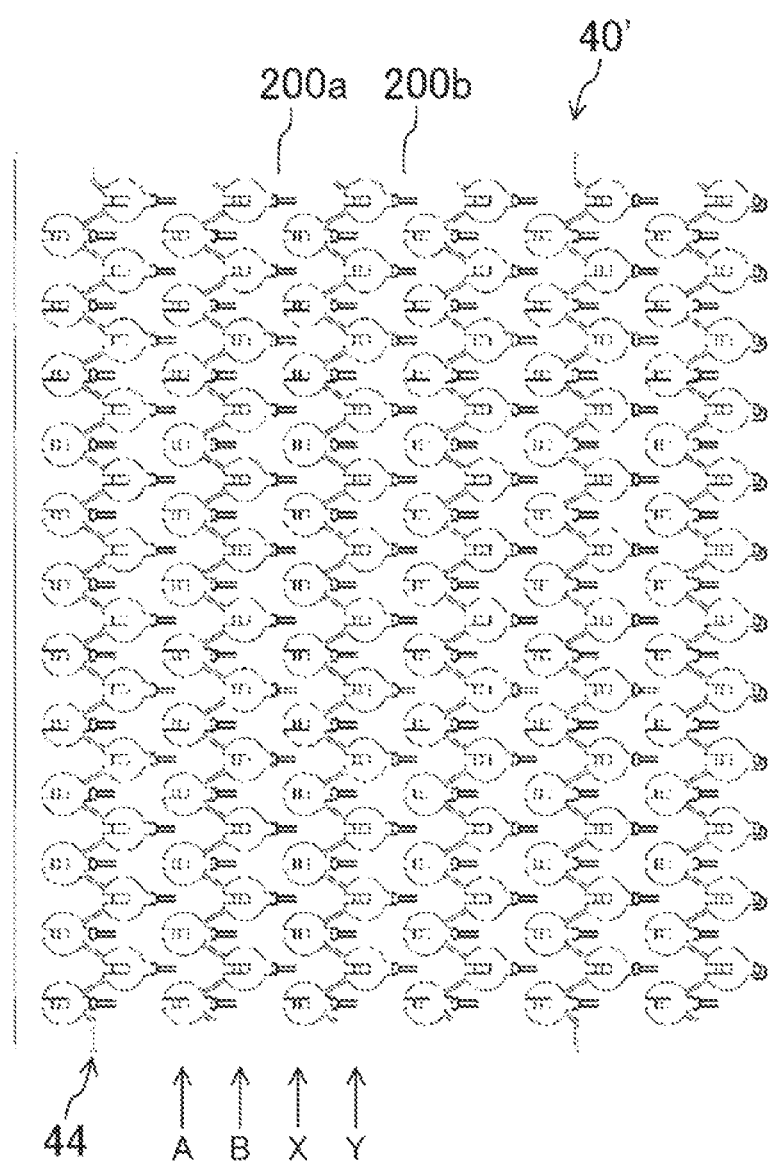
FIG. 8 is a plan view showing an example of a conductive member.

FIG. 8 is a plan view showing all conductive members 40', 200a, 200b, . . . , but in order to make the drawing and the description simple, a number of cells 10 is reduced as compared with cell module 100 shown in FIG. 4. In the cell module that uses conductive members 40', 200a, 200b, . . . shown in FIG. 8, twelve cells 10, 10, . . . adjacent to each other in the vertical direction are aligned to form one row, and twelve rows are provided. Two of the rows make up one cell block; therefore, six cell blocks are provided in total. Note that although no cell 10 is shown in FIG. 8, a description will be given below of the cell module (including a plurality of cells 10) using conductive members 40', 200a, 200b, . . . shown in FIG. 8.

In the cell module using conductive member 40' shown in FIG. 8, a first cell block is made up of rows A and B, and a second cell block is made up of rows X and Y adjacent to the first cell block. Each row includes twelve cells 10. Further, conductive members 40', 200a, 200b, . . . extend along the rows of cells 10.

In the first cell block made up of rows A and B, the negative-electrode terminals (connection intervening members) of all the cells in rows A and B are connected by conductive member 200a. Further, in the second cell block made up of rows X and Y, the positive-electrode terminals of all the cells in rows X and Y are connected by conductive member 200a. That is, conductive member 200a connects the negative electrodes of all the cells in rows A and B in parallel, connects the positive electrodes of all the cells in rows X and Y in parallel, and further connects the negative electrode of all the cells in rows A and B and the positive electrode of all the cells in rows X and Y in series. Note that, of conductive members arranged on both ends among the plurality of conductive members, a conductive member located on one end only connects the positive-electrode terminals of the cell block located on one end side in parallel, and a conductive member located on the other end only connects the negative-electrode terminals of the cell block located on the other end side in parallel.

Further, in the second cell block made up of rows X and Y, two conductive members including conductive member 200a to which the positive-electrode terminals of all the cells in rows X and Y are connected and conductive member 200b to which the negative-electrode terminals of all the cells in rows X and Y are connected are disposed. The same goes for all cell blocks, and two conductive members are disposed for one cell block.

Therefore, the cell module shown in FIG. 8 is made up of six cell blocks connected in series, each of the six cell blocks being made up of 24 (12*2 rows) cells connected in parallel. Then, on the positive-electrode side current collecting member and the negative-electrode side current collecting member disposed on both the side ends of the cell module, the one-end and other-end conductive members disposed on both the side ends of the cell module are electrically connected. This allows electric power for the six series-connected rows of the 24 parallel-connected cells to be output from the positive-electrode side external terminal connector and the negative-electrode side external terminal connector provided on both the side ends of the cell module.

According to the present exemplary embodiment, since the combination of the insulating plate with holes and the conductive member made of metal foil allows the current to be collected from each cell, it is possible to make the structure simple and to reduce the manufacturing cost. Further, since the conductive member is made of metal foil, it is possible to make the working such as etching with high accuracy and at low cost and in turn makes it possible to reduce variations in amount of current causing rupture among the parts that are each connected to a corresponding one of the cells and serve as a fuse in one cell module.

Further, since the connection with the terminal of the cell and the current collection are made by one metal foil, it is possible to make the current collection loss small. Note that a configuration where a 18650 cell is used as the cell, and Al foil with a thickness of 150 μm is used as the conductive member allows 2 A/cell to flow on the condition that the connecting portion has a width of 1 mm, the positive-electrode terminal connector has a width of 3 mm, and the minimum length between the holes adjacent to each other of the conductive member is 8 mm.

Further, since the connection intervening member is mounted on each cell, the conductive member and the negative-electrode terminal of each cell can be electrically connected in a reliable manner and with low resistance.

Further, when gas generated in the cell is discharged to the outside of the cell due to a rise in pressure inside the cell, the gas ruptures an exhaust port covered only by the conductive member that is metal foil and is easily discharged, which prevents the pressure inside the cell from excessively rising.

The positions where the positive-electrode terminal connector and the negative-electrode terminal connector are provided, the shapes of the positive-electrode terminal connector and the negative-electrode terminal connector, and the like can be relatively freely designed so as to make an internal short circuit less prone to occur and to increase safety.

Since the positive-electrode terminal connector and the negative-electrode terminal connector are made of metal foil, the connection between the positive-electrode terminal connector and the positive-electrode terminal and the connection between the negative-electrode terminal connector and the negative-electrode terminal can be made by welding or the like in a relatively simple and reliable manner, making it possible to reduce the manufacturing cost.

SECOND EXEMPLARY EMBODIMENT

According to a second exemplary embodiment, a connection intervening member different in shape from the connection intervening member according to the first exemplary embodiment is used, but the cell and the other parts are the same as the cell and the other parts according to the first exemplary embodiment; therefore, a description will be given below of only differences from the first exemplary embodiment.

Figure 9:
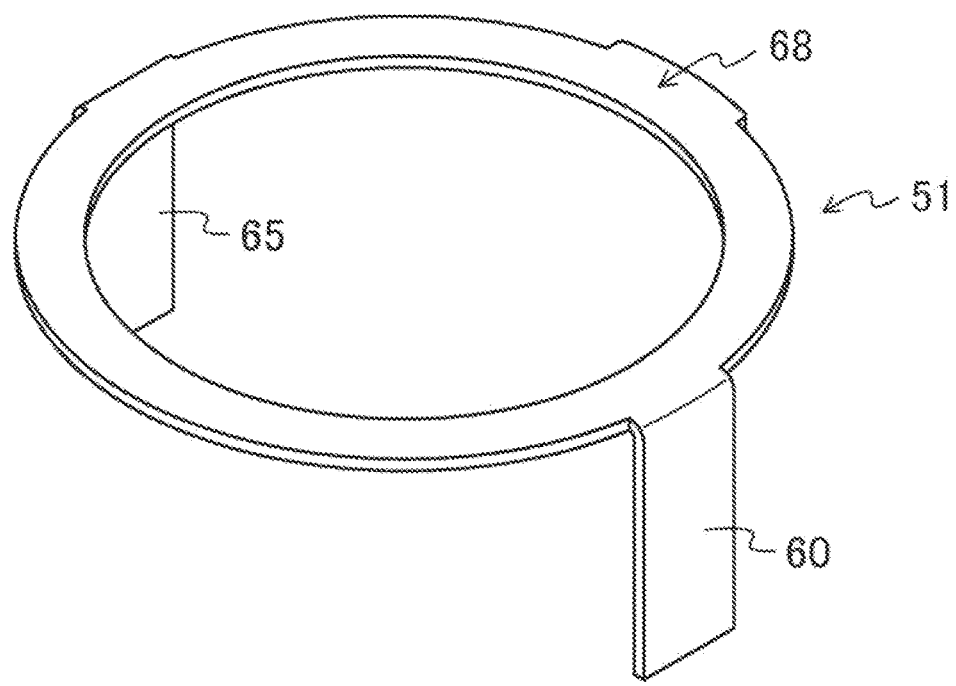
FIG. 9 is a schematic perspective view of a connection intervening member according to another exemplary embodiment.

FIG. 9 shows connection intervening member 51 according to the second exemplary embodiment. Connection intervening member 51 according to the present exemplary embodiment has a configuration where tongue-shaped piece 65 is added to connection intervening member 50 according to the first exemplary embodiment. Tongue-shaped piece 65 is identical in shape to tab 60 and extends in the same direction, but is different from tab 60 in attachment position to the main body of connection intervening member 51 and in that tongue-shaped piece 65 is not electrically connected to the side surface of the cell. When cells 10 are arranged in accordance with the arrangement applied to cell module 100, tongue-shaped pieces 65 are also disposed in the gap (space) formed by cells adjacent to each other in the same manner as tabs 60.

Note that tongue-shaped piece 65 may be different in shape from tab 60.

According to the present exemplary embodiment, since the side surface of the cell is held by both tab 60 and tongue-shaped piece 65, connection intervening member 51 is positioned only by being mounted on cell 10 and is not misaligned even when tab 60 is electrically connected to the side surface of cell 10, which allows easy handling, an increase in manufacturing speed, and a reduction in manufacturing cost. Further, the present exemplary embodiment has the same effect as of the first exemplary embodiment.

THIRD EXEMPLARY EMBODIMENT

According to a third exemplary embodiment, a connection intervening member different in shape from the connection intervening member according to the first exemplary embodiment is used, but the cell and the other parts are the same as the cell and the other parts according to the first exemplary embodiment; therefore, a description will be given below of only differences from the first exemplary embodiment.

Figure 10:
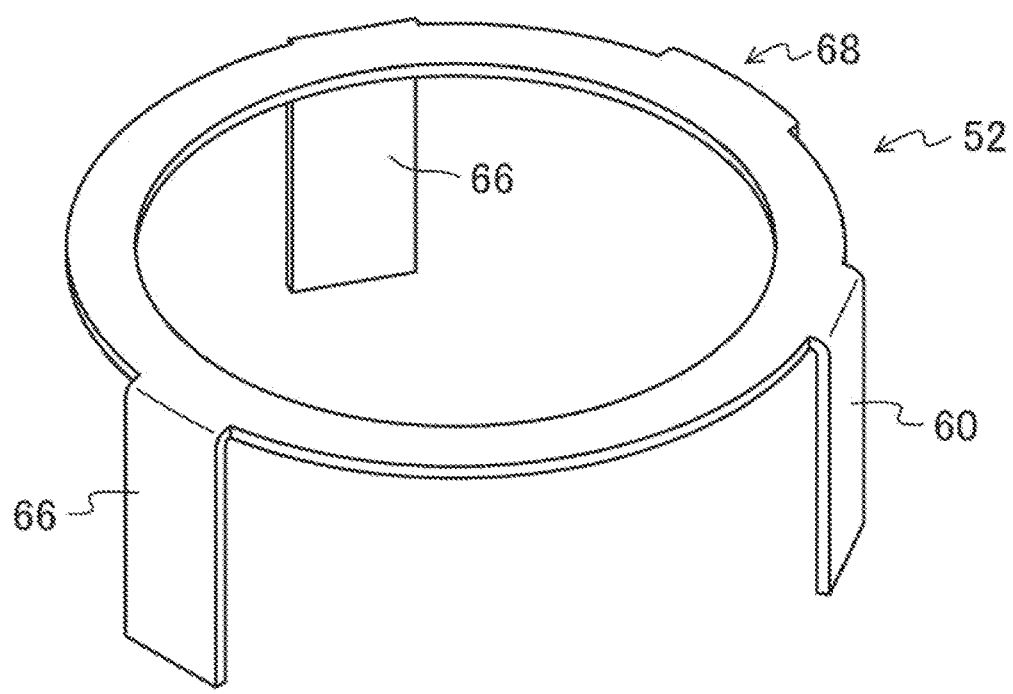
FIG. 10 is a schematic perspective view of a connection intervening member according to still another exemplary embodiment.

FIG. 10 shows connection intervening member 52 according to the third exemplary embodiment. Connection intervening member 52 according to the present exemplary embodiment has a configuration where two tongue-shaped pieces 66, 66 are added to connection intervening member 50 according to the first exemplary embodiment. Tongue-shaped pieces 66, 66 are identical in shape to tab 60 and extend in the same direction, but are different from tab 60 in attachment position to the main body of connection intervening member 52 and in that tongue-shaped pieces 66, 66 are not electrically connected to the side surface of the cell. When cells 10 are arranged in accordance with the arrangement applied to cell module 100, tongue-shaped pieces 66, 66 are also disposed in the gap (space) formed by cells adjacent to each other in the same manner as tabs 60.

Tongue-shaped pieces 66 may be different in shape from tab 60.

According to the present exemplary embodiment, since the side surface of the cell is held by tab 60 and two tongue-shaped pieces 66, 66, connection intervening member 52 is positioned only by being mounted on cell 10 and is not misaligned even when tab 60 is electrically connected to the side surface of cell 10, which allows easy handling, an increase in manufacturing speed, and a reduction in manufacturing cost as compared with the second exemplary embodiment where one tongue-shaped piece 65 is provided. Further, the present exemplary embodiment has the same effect as of the first exemplary embodiment.

(Fourth exemplary embodiment)

According to a fourth exemplary embodiment, a connection intervening member different in shape from the connection intervening member according to the first exemplary embodiment, but the cell and the other parts are the same as the cell and the other parts according to the first exemplary embodiment; therefore, a description will be given below of only differences from the first exemplary embodiment.

Figure 11:
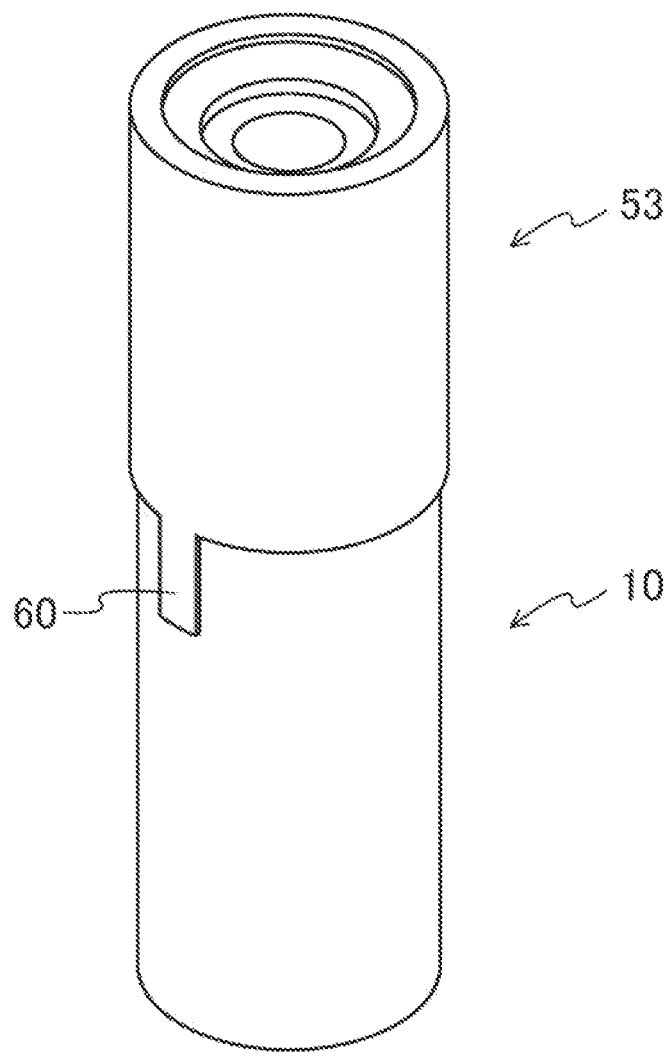
FIG. 11 is a schematic perspective view of a connection intervening member according to yet another exemplary embodiment.

FIG. 11 shows connection intervening member 53 according to the fourth exemplary embodiment. Connection intervening member 53 according to the present exemplary embodiment has a configuration where a tubular portion extends from the entire outer circumferential edge of connection intervening member 50 according to the first exemplary embodiment along the side surface of cell 10, and tab 60 extends from the tubular portion.

According to the present exemplary embodiment, since the tubular portion is put on cell 10, connection intervening member 53 is positioned only by being mounted on cell 10 and is not misaligned even when tab 60 is electrically connected to the side surface of cell 10, which allows easy handling, an increase in manufacturing speed, and a reduction in manufacturing cost. Further, when the internal pressure of cell 10 rises due to, for example, an internal short circuit of cell 10, and gas is ejected from a crack in the side surface of the cell because the safety mechanism alone cannot handle the situation, a crack tends to be produced in the tubular portion on one end (upper side in the drawings) of the cylinder of cell 10 where positive-electrode terminal 8 and negative-electrode terminal 7*a* are provided due to the structure of cell 10. This is effective in preventing adjacent cell 10 from being burned by a spreading fire by being exposed to high-temperature gas through the crack. Further, the present exemplary embodiment has the same effect as of the first exemplary embodiment.

OTHER EXEMPLARY EMBODIMENTS

The above-described exemplary embodiments are merely illustrative examples of the present invention, and the present invention is not limited to such examples, and a well-known art, a commonly-used art, and a publicly-known art may be combined or partially replaced with the examples. A modified invention that can be easily conceived by the person of ordinary skill in the art also falls within the scope of the present invention.

The cell may have a square cylindrical shape, or the center of the upper end surface may serve as the negative electrode, and the circumferential edge may serve as the positive electrode.

A material of the connection intervening member is preferably metal, but is not limited to a specific material as long as the material has conductivity. Further, the width of the ring-shaped portion of the connection intervening member is not limited to a specific width as long as the connection intervening member is stable when being mounted on the cell, does not obstruct the electrical connection between the positive-electrode terminal and the positive-electrode terminal connector, has no risk of short circuit, and can be reliably connected to the negative-electrode terminal connector.

The shape, size, length, or the like of the tab is not limited to the above example, and the tab may have any shape, size, and length as long as it is ensured that the tab is electrically connected to the side surface of the cell in a reliable manner and comes into contact with neither the adjacent cell nor the adjacent connection intervening member.

The shape, size, or position of the outward protrusion is not limited to a specific shape, size, or position. It is preferable that the outward protrusion be provided to connect to the terminal connector, but the outward protrusion need not be necessarily provided.

It is preferable that the insulating plate and the conductive member be fixed to each other with an adhesive or the like. For example, a method for forming a conductive member by putting metal foil on an insulating plate having a hole and applying etching or the like to the metal foil is preferable in terms of manufacturing cost and accuracy.

The shape of the hole in the insulating plate may be any shape as long as the positive-electrode terminal and the negative-electrode terminal are exposed.

The material and thickness of the conductive member may be desirably set in accordance with design values corresponding to settings such as the capacity of the cell module and the charge and discharge rate. Metal foil or a metal sheet may be used.

The part serving as the fuse may be the positive-electrode side terminal connector. Further, in order to reduce the cross-sectional area of the current flow path to make the cross-sectional area less than or equal to the predetermined area so as to enable the fuse to work, the predetermined area needs to be set with consideration given to settings such as a number of cells per row, a number of rows making up the cell block, the material, thickness, and area of the conductive member, and the charge and discharge rate of the cell module because the predetermined area varies in a manner that depends on each cell module.

REFERENCE MARKS IN THE DRAWINGS 7a negative-electrode terminal
8 positive-electrode terminal
10 cell
20 cell block
30 insulating plate (plate having electrical insulating properties)
31 hole
40, 40' conductive member
41 positive-electrode terminal connector
42 connecting portion
43 negative-electrode terminal connector
50, 51, 52, 53 connection intervening member
60 tab
65, 66 tongue-shaped piece
68 outward protrusion
70 protective member
100 cell module
200a, 200b conductive member
A, B, X, Y row

The invention claimed is:

1. A cell module comprising a plurality of cells, wherein each of the plurality of cells has a cylindrical shape and includes a positive-electrode terminal and a negative-electrode terminal disposed on one end of the each of the plurality of cells,
one terminal of the positive-electrode terminal and the negative-electrode terminal is located at a center of the one end, and another terminal of the positive-electrode terminal and the negative-electrode terminal is located on a peripheral edge of the one end and is electrically connected to a side surface of a tube of the each of the plurality of cells,
the each of the plurality of cells includes a connection intervening member on the peripheral edge of the one end,
the connection intervening member includes a tab extending along the side surface of the tube of the each of the plurality of cells and electrically connected to the side surface, and a hole that causes the center of the one end to be exposed,
the plurality of cells make up cell blocks, each of the cell blocks being a block where a plurality of cells adjacent to each other in the plurality of cells are arranged, the one ends of the plurality of cells adjacent to each other being oriented in an identical direction, and the plurality of cells adjacent to each other are aligned in rows,
the cell module further comprises a plate having electrical insulating properties, the plate being on the one ends of the plurality of cells arranged,
the plate includes a hole that causes the one end of each of the plurality of cells to be exposed, and a plurality of conductive members on a surface of the plate, the surface being opposite to a surface of the plate which faces the plurality of cells,
the conductive members extend along the rows of the plurality of cells aligned in each of the cell blocks, and two of the conductive members are disposed for each of the cell blocks, the conductive members each including terminal connectors that pass through the holes to be electrically connected to terminals, having identical polarity, of the plurality of cells included in the cell block, and
an electrical connection between the another terminal and each of the terminal connectors is established through a connection between each of the terminal connectors and the connection intervening member.

2. The cell module according to claim 1, wherein the tab is disposed separate from an adjacent cell of the each of the plurality of cells.

3. The cell module according to claim 2, wherein
the each of the plurality of cells have a cylindrical shape, and
the tab is disposed in a space formed between the adjacent cell and the each of the plurality of cells.

4. The cell module according to claim 1, wherein a protective member having electrical insulating properties is disposed between the connection intervening member and the one end of the each of the plurality of cells.

5. The cell module according to claim 1, wherein the connection intervening member further includes a tongue-shaped piece extending along the side surface of the tube of the each of the plurality of cells.

6. The cell module according to claim 1, wherein
the connection intervening member includes an outward protrusion that protrudes outward relative to other portions, and
the outward protrusion is connected to each of the terminal connectors.

7. The cell module according to claim 6, wherein the outward protrusion is disposed separate from an adjacent cell of the each of the plurality of cells.

* * * * *